US011962084B2

(12) United States Patent
Spencer et al.

(10) Patent No.: US 11,962,084 B2
(45) **Date of Patent: *Apr. 16, 2024**

(54) TECHNIQUES FOR ANTENNA

(71) Applicant: nCap Licensing, LLC, Heber City, UT (US)

(72) Inventors: Rhett Francis Spencer, Heber City, UT (US); Anthony Joseph Sutera, Heber City, UT (US)

(73) Assignee: nCap Licensing, LLC, Heber, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,917

(22) Filed: Dec. 1, 2020

(65) Prior Publication Data

US 2021/0167493 A1 Jun. 3, 2021

Related U.S. Application Data

(63) Continuation of application No. 16/551,649, filed on Aug. 26, 2019, now Pat. No. 10,854,966, which is a continuation of application No. 16/043,151, filed on Jul. 23, 2018, now Pat. No. 10,396,451, which is a continuation-in-part of application No. 15/960,544, (Continued)

(51) Int. Cl.

| | |
|---|---|
| ***H01Q 1/38*** | (2006.01) |
| ***H01Q 1/24*** | (2006.01) |
| ***H01Q 1/36*** | (2006.01) |
| ***H01Q 1/52*** | (2006.01) |
| ***H01Q 9/04*** | (2006.01) |
| ***H01Q 9/28*** | (2006.01) |
| ***H01Q 17/00*** | (2006.01) |

(52) U.S. Cl.
CPC ............... *H01Q 1/526* (2013.01); *H01Q 1/24* (2013.01); *H01Q 1/243* (2013.01); *H01Q 1/364* (2013.01); *H01Q 1/38* (2013.01); *H01Q 9/0407* (2013.01); *H01Q 9/28* (2013.01); *H01Q 17/004* (2013.01); *Y10T 29/49016* (2015.01)

(58) Field of Classification Search
CPC .......... H01Q 1/273; H01Q 1/38; H01Q 1/526; H01Q 9/0407
See application file for complete search history.

(56) References Cited

U.S. PATENT DOCUMENTS 7,317,420 B2 * 1/2008 Aisenbrey .............. H01Q 1/364 343/702
10,396,451 B2 * 8/2019 Spencer ............... H01Q 17/004
(Continued)

*Primary Examiner* — Daniel Munoz
(74) *Attorney, Agent, or Firm* — Jefferson IP Law, LLP; Raymond B. Persino

(57) ABSTRACT

A flexible antenna is provided. The flexible antenna includes a cable comprising at least one conductor, and an antenna body comprising a protective layer and a flexible circuit layer. The flexible circuit layer including a non-conductive sheet, at least one conductive feed pad and at least one antenna element. The at least one antenna element is formed of a conductive particle based material comprising conductive particles dispersed in a binder so that at least a majority of the conductive particles are adjacent to, but do not touch, one another. The at least one antenna element is disposed between the protective layer and the flexible circuit layer. The at least one conductor of the cable is electrically connected to the at least one feed pad.

15 Claims, 7 Drawing Sheets

Related U.S. Application Data filed on Apr. 23, 2018, now Pat. No. 10,498,024, and a continuation of application No. 14/849,570, filed on Sep. 9, 2015, now abandoned, said application No. 15/960,544 is a continuation of application No. 14/804,018, filed on Jul. 20, 2015, now Pat. No. 9,954,276, which is a continuation of application No. 13/303,135, filed on Nov. 22, 2011, now Pat. No. 9,088,071.

(60) Provisional application No. 62/048,201, filed on Sep. 9, 2014, provisional application No. 61/514,435, filed on Aug. 2, 2011, provisional application No. 61/477,587, filed on Apr. 20, 2011, provisional application No. 61/473,726, filed on Apr. 8, 2011, provisional application No. 61/416,093, filed on Nov. 22, 2010.

(56) References Cited

U.S. PATENT DOCUMENTS

2005/0167189 A1* 8/2005 Aisenbrey ........... B29C 45/0013 181/148
2012/0146855 A1* 6/2012 Spencer ................... H01Q 1/38 343/700 MS
2014/0028518 A1* 1/2014 Arnold ................. H01Q 1/2283 343/841

* cited by examiner

TECHNIQUES FOR ANTENNA

CROSS-REFERENCE TO RELATED APPLICATION

This application is a continuation application of prior application Ser. No. 16/551,469, filed on Aug. 26, 2019, which issued as which issued as U.S. Pat. No. 10,854,966 on Dec. 1, 2020; and which is a continuation application of prior application Ser. No. 16/043,151, filed on Jul. 23, 2018, which issued as U.S. Pat. No. 10,396,451 on Aug. 27, 2019. Prior application Ser. No. 16/043,151, filed on Jul. 23, 2018, which issued as which issued as U.S. Pat. No. 10,396,451 on Aug. 27, 2019, is a continuation application of prior application Ser. No. 14/849,570, filed on Sep. 9, 2015, which claims the benefit under 35 U.S.C. § 119(e) of a U.S. provisional patent application filed on Sep. 9, 2014 in the U.S. Patent and Trademark Office and assigned Ser. No. 62/048,201. Also, prior application Ser. No. 16/043,151, filed on Jul. 23, 2018, which issued as which issued as U.S. Pat. No. 10,396,451 on Aug. 27, 2019, is a continuation-in-part application of prior application Ser. No. 15/960,544, filed on Apr. 23, 2018, which issued as which issued as U.S. Pat. No. 10,498,024 on Dec. 3, 2019; which is a continuation application of prior application Ser. No. 14/804,018, filed on Jul. 20, 2015, which issued as U.S. Pat. No. 9,954,276 on Apr. 23, 2018; which is a continuation application of prior application Ser. No. 13/303,135, filed on Nov. 22, 2011, which issued as U.S. Pat. No. 9,088,071 on Jul. 21, 2015; and which claimed the benefit under 35 U.S.C. § 119(e) of a U.S. provisional patent application filed on Nov. 22, 2010 in the U.S. Patent and Trademark Office and assigned Ser. No. 61/416,093, a U.S. provisional patent application filed on Apr. 8, 2011 in the U.S. Patent and Trademark Office and assigned Ser. No. 61/473,726, a U.S. provisional patent application filed on Apr. 20, 2011 in the U.S. Patent and Trademark Office and assigned Ser. No. 61/477,587, and a U.S. provisional patent application filed on Aug. 2, 2011 in the U.S. Patent and Trademark Office and assigned Ser. No. 61/514,435. The entire disclosure of each of the above identified applications is hereby incorporated by reference in their entirety.

TECHNICAL FIELD

The present disclosure relates to techniques for a flexible antenna.

BACKGROUND

Antennas of the related art that are indented to be worn on the body of a person suffer various shortcomings. In particular, the body-worn antennas of the related art may be cumbersome or fragile due to at least one of their size, orientation, construction, and means of attachment to the body of the person. Further, the body-worn antennas of the related art may have a size or length that makes the body-worn antennas of the related art visible, thereby preventing their use in covert operations. Still further, the body-worn antennas of the related art may exhibit mitigated performance due to tradeoffs in their size and design that enable the body-worn antenna to be worn on the body of the person. Moreover, the body-worn antennas of the related art may be limited in at least one of their operational bandwidth and power handling capabilities. Due to such limitations in in at least one of bandwidth and power handling capabilities, a person may need to use a plurality of the body-worn antennas of the related art.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to provide techniques for a flexible antenna.

In accordance with an aspect of the present disclosure, a flexible antenna is provided. The flexible antenna includes a cable comprising at least one conductor, and an antenna body comprising a protective layer and a flexible circuit layer. The flexible circuit layer including a non-conductive sheet, at least one conductive feed pad and at least one antenna element. The at least one antenna element is formed of a conductive particle based material comprising conductive particles dispersed in a binder so that at least a majority of the conductive particles are adjacent to, but do not touch, one another. The at least one antenna element is disposed between the protective layer and the flexible circuit layer. The at least one conductor of the cable is electrically connected to the at least one feed pad.

Other aspects, advantages, and salient features of the present disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
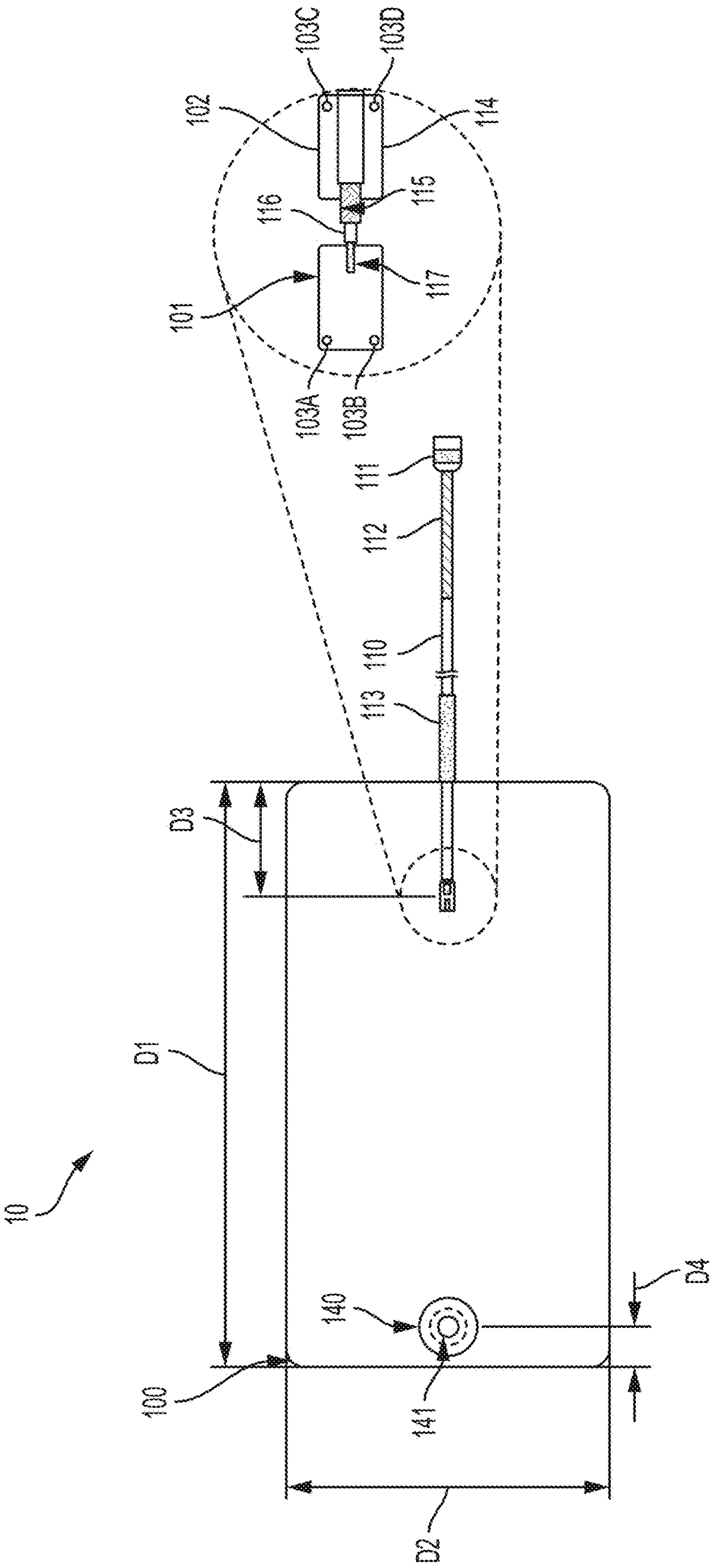
FIGS. 1A-1D illustrates a patch antenna according to various embodiments of the present disclosure.
Figure 1B:
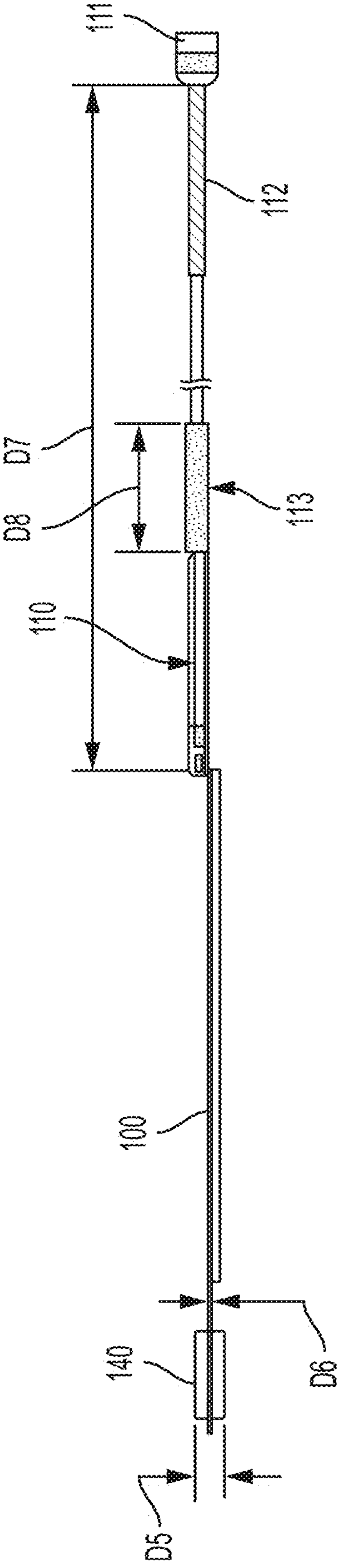
Figure 1C:
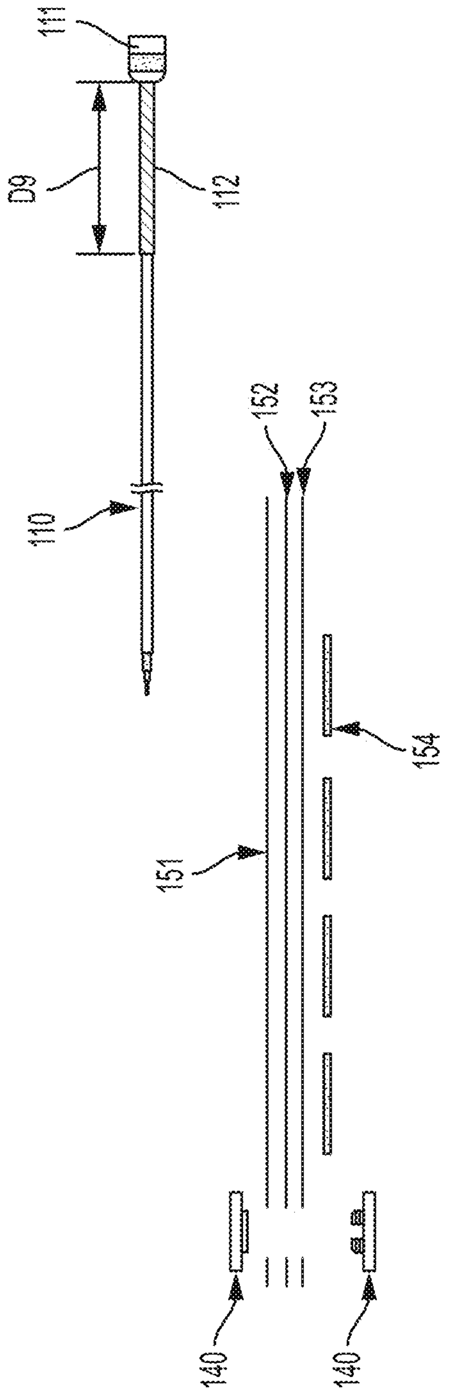

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

As used herein, the term “substantially” refers to the complete or nearly complete extent or degree of an action, characteristic, property, state, structure, item, or result. For example, an object that is “substantially” enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of “substantially” is equally applicable when used in a negative connotation to refer to the complete or near complete lack of an action, characteristic, property, state, structure, item, or result.

As used herein, the term “about” is used to provide flexibility to a numerical range endpoint by providing that a given value may be “a little above” or “a little below” the endpoint.

As used herein, the term “antenna” refers to a transducer used to transmit and/or receive electromagnetic radiation. That is, an antenna converts electromagnetic radiation into electrical signals and vice versa.

In addition, various embodiments of the present disclosure described below relate to techniques for a patch antenna. While the techniques for the patch antenna may be described below in various specific implementations, the present disclosure is not limited to those specific implementations.

The patch antenna described herein operates over a wide range of frequencies from less than 1 MHz to over 10 GHz. A power level may be kept low due to the patch antenna’s efficiency. Furthermore, patch antennas of various sizes allows for various power levels for transmitting and a variety of apertures (capture area) when receiving signals.

In certain implementations, the patch antenna described herein is sufficiently rugged and sized so as to be worn on the body of a person. For example, the patch antenna may be worn on an article of clothing at the shoulder of a person while being minimally visible. Further, due to the wide bandwidth capabilities, the patch antenna may be used in place of a plurality of bandwidth specific antennas.

Patch Antenna Configurations

FIGS. 1A-1D illustrates a patch antenna according to various embodiments of the present disclosure.

Referring to FIGS. 1A-1D, patch antenna 10 includes antenna body 100 and cable 110. Cable 110 may be a coaxial cable including external protective cover 114, grounded shield 114, insulator 115, and conductor 116. Connector 111 may be installed at one end of cable 110. Heat shrink tube 112 may be applied at the junction of cable 110 and connector 111. The other end of cable 110 is attached to antenna body 100. The attachment of cable 110 to antenna body 100 is described in detail further below.

Antenna body 100 comprises a plurality of layers. For example, antenna body 100 may include three layers, namely flexible circuit layer 151, adhesive layer 152, and protective layer 153. Adhesive layer 152 may be a double sided adhesive film, a layer of applied adhesive, or any other similar or suitable adhesive. Adhesive layer 152 adheres flexible circuit layer 151 and protective layer 153. Adhesive layer 152 may be about 0.002 inches thick. Herein, while three layers are described herein, additional layers may be added that provide spacing and/or augmentation of the antenna properties.

Protective layer 153 may be a polycarbonate material that provides support, protection, and/or an ornamental finish to antenna body 100. Additional protective and/or ornamental layers, coverings, or applications may be applied to one or both sides of antenna body 100. Protective layer 153 may be about 0.017 inches thick.

Flexible circuit layer 151 may be constructed of a non-conductive material such as polyimide, a conductive material, a conductive particle based material, and any other similar or suitable materials. Flexible circuit layer 151 may be about 0.007 inches thick. In particular, flexible circuit layer 151 may include a non-conductive sheet, such as a sheet of polyimide, having a layer of the conductive material disposed in certain areas on both sides of the sheet of polyimide. The sheet of polyimide having the layer of the conductive material disposed in certain areas on both sides of the sheet of polyimide, may be constructed by performing an etching process, a deposition process, a think film process, or other similar or suitable processes. In one example, the conductive material is copper. In addition, after the conductive material is applied to the sheet of polyimide, through holes 103A-103D may be formed and the conductive material may be plated with nickel and/or tin one or more times. Herein, while four through holes 103A-103D are shown, less or more through holes may be implemented.

Figure 1D:
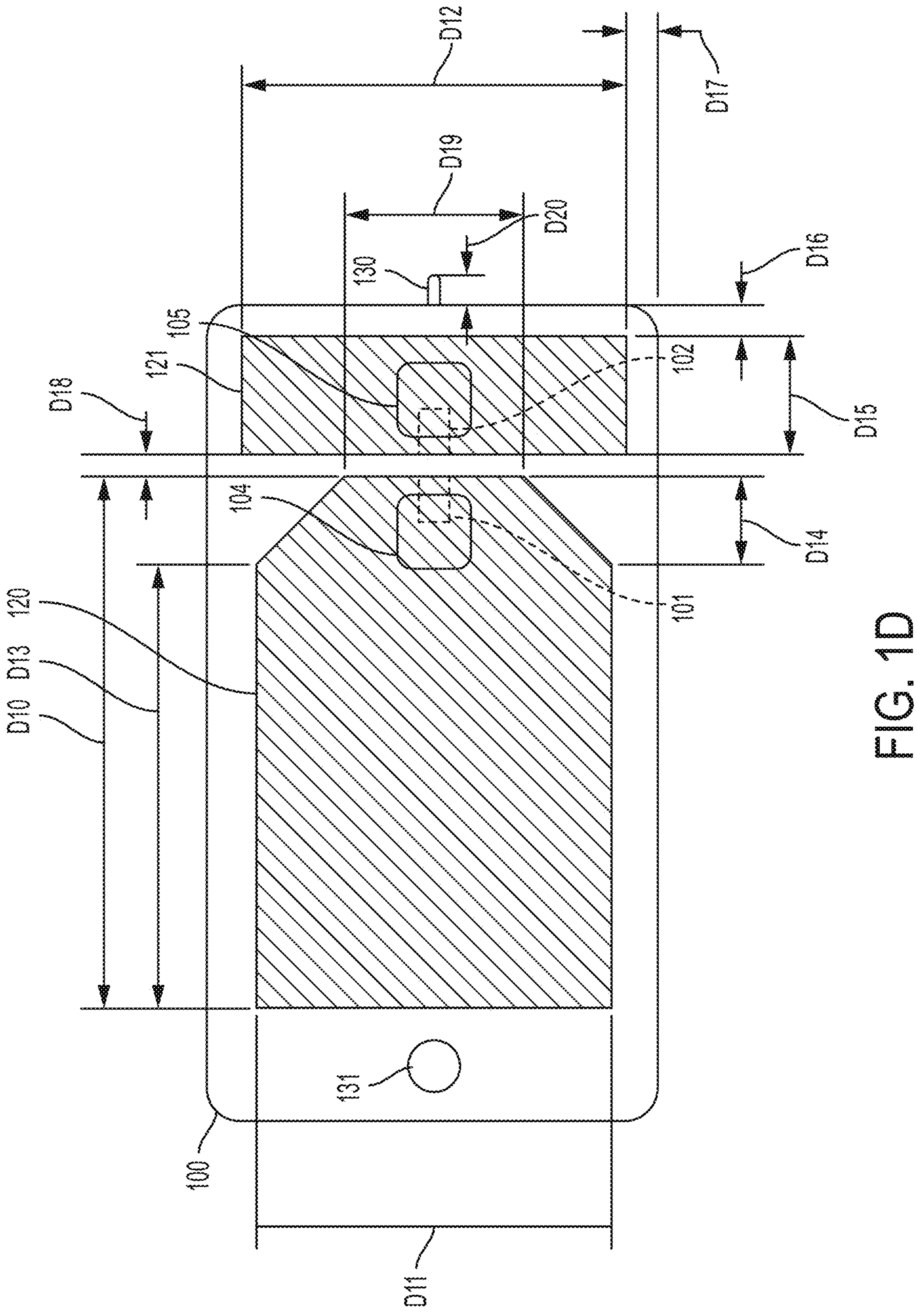
Figure 2A:
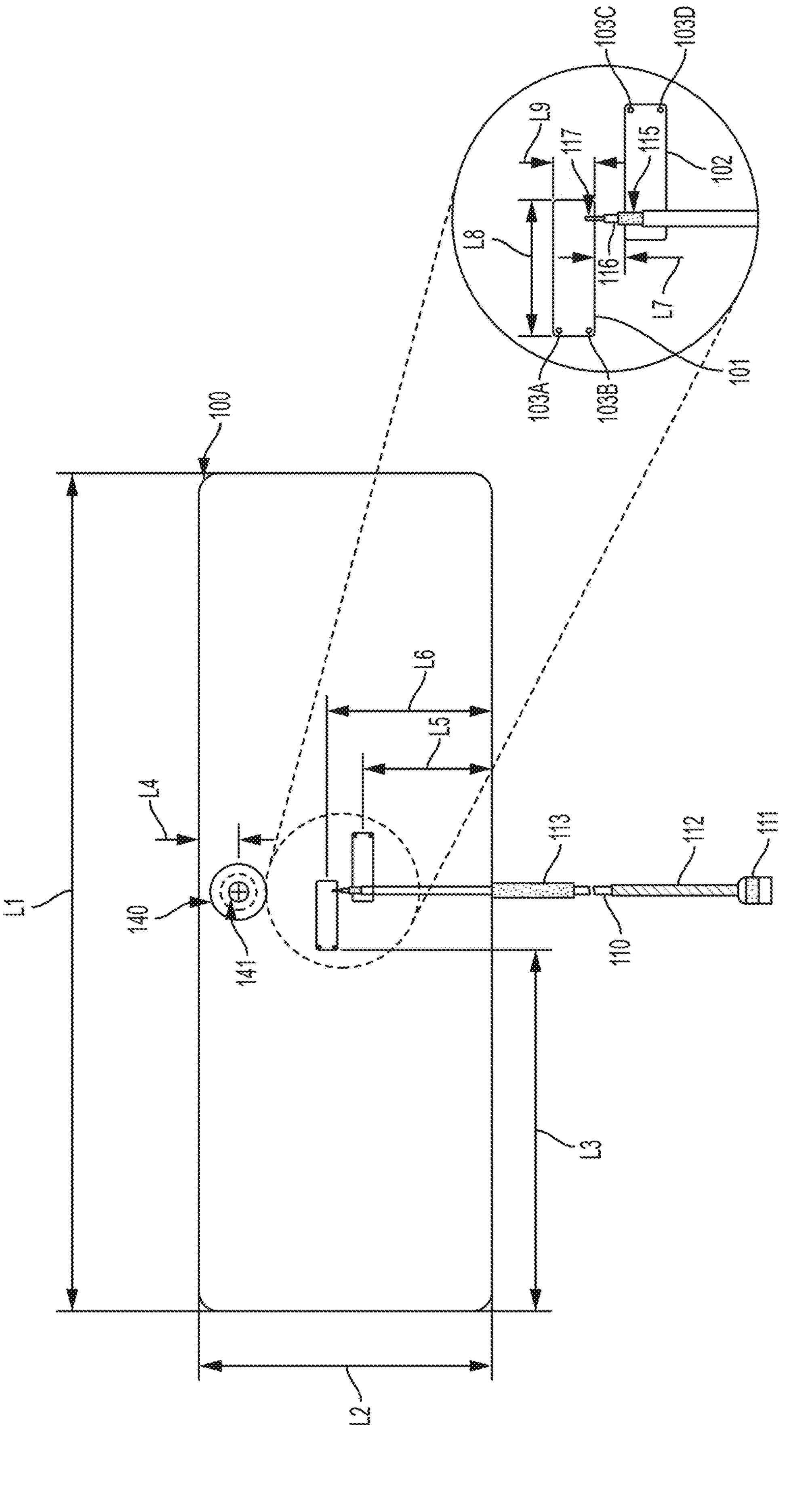
FIGS. 2A-2D illustrate the patch antenna according to various embodiments of the present disclosure.
Figure 2B:
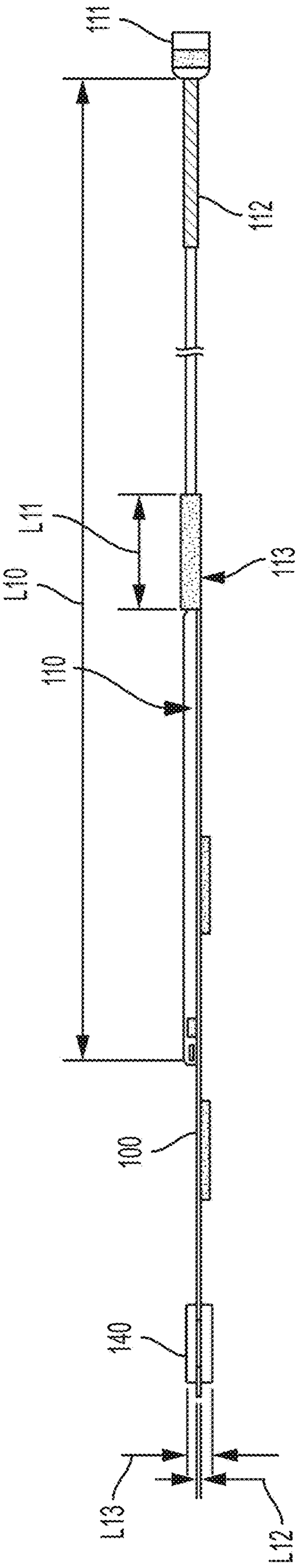
Figure 2C:
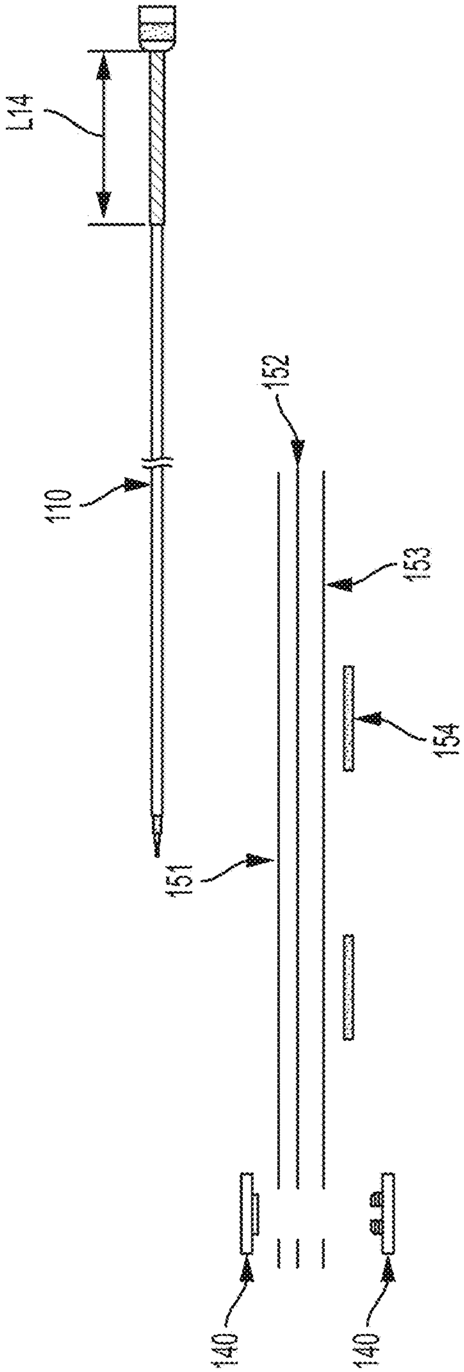
Figure 2D:
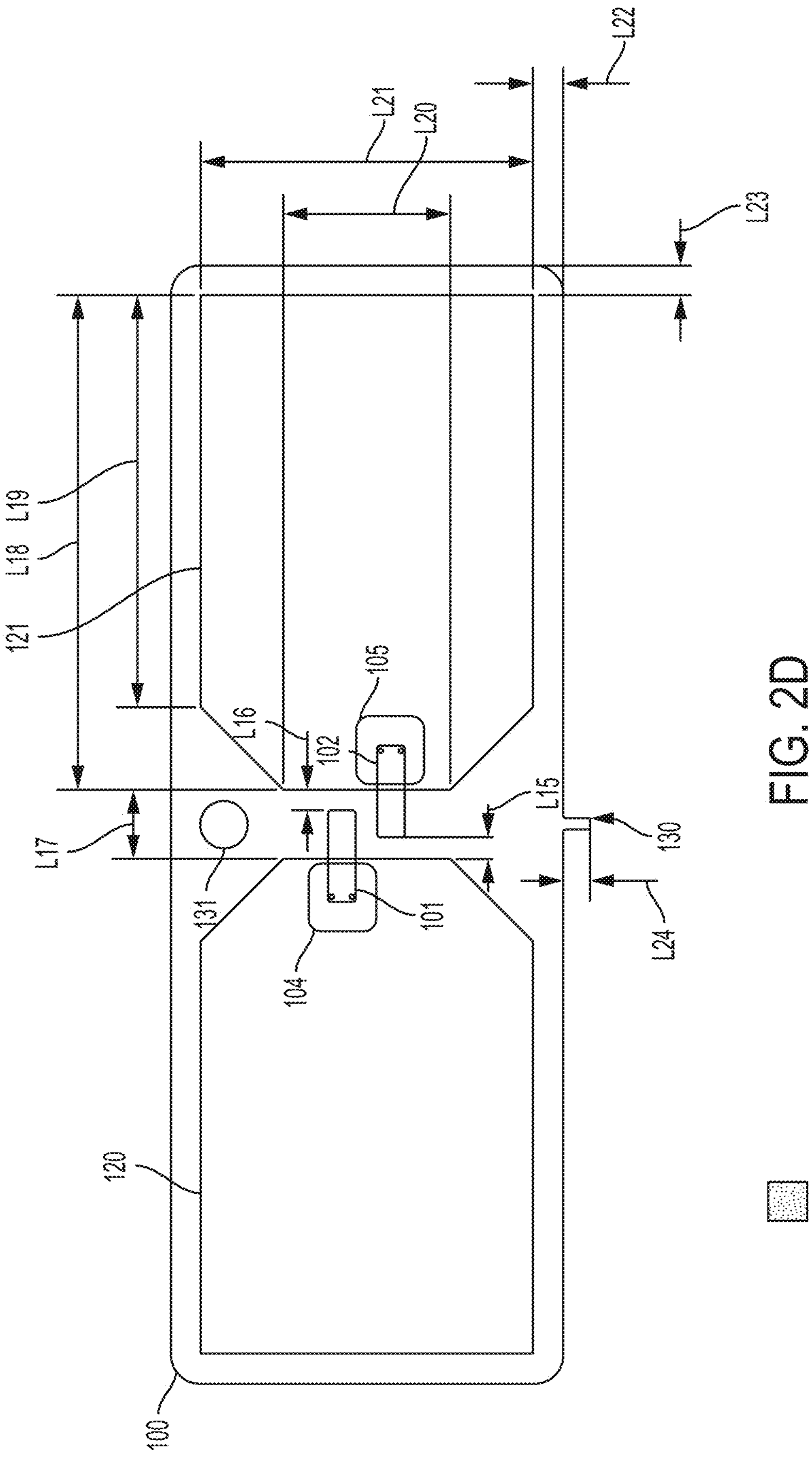

As seen in FIG. 1D, the conductive material disposed on one side of the sheet of polyimide forms feed pads 104 and 105 used to respectively couple to antenna elements 120 and 121. Antenna elements 120 and 121 are formed of the conductive particle based material, and are disposed over feed pads 104 and 105 and a portion of the sheet of polyimide not including feed pads 104 and 105. Antenna elements 120 and 121 cover both feed pads 104 and 105 and portions of the sheet of polyimide not covered by feed pads 104 and 105. Feed pads 104 and 105 may be sized about 0.750 inches by 0.750 inches. The conductive particle based material is applied to form antenna elements 120 and 121 via a painting, spray painting, silk screening, or other similar or suitable processes. The conductive particle based material is described in further detail below. In one example, the conductive particle based material is silk screened twice, allowed to cure, and then the conductive particle based material is may again be silk screened twice, and allowed to cure. As an alternative to the conductive particle based material, one or both of antenna elements 120 and 121 may be formed using a conductive material, such as copper. Antenna elements 120 and 121 may be formed to have various two dimensional shapes depending desired antenna characteristics. One example of the two dimensional shapes for antenna elements 120 and 121 is shown in the hatched area of FIG. 1D.

As seen in FIG. 1A, the conductive material disposed on the other side of the sheet of polyimide forms feed pads 101 and 102 that are used to couple to cable 110. In addition, through though holes 103 are used to electrically connect feed pads 101 and 102 with feed pads 104 and 105.

As further seen in FIG. 1A, the end of cable 110 attached to antenna body 100 is attached to feed points 101 and 102 such that conductor 117 is electrically coupled to feed point 101 and grounded shield 114 is electrically coupled to feed point 102. The electrical coupling between cable 110 and feed points 101 and 102 may be by a soldering process or any other similar or suitable processes.

When cable 110 is attached to antenna body 100, conductor 117, feed point 101, and feed point 104 are electrically coupled via through holes 103A and 103B. Similarly, when cable 110 is attached to antenna body 100, grounded shield 114, feed point 102, and feed point 105 are electrically coupled via through holes 103C and 103D. Here, conductor 117, feed point 101, and feed point 104 are electrically isolated from grounded shield 114, feed point 102, and feed point 105.

After cable 110 is attached to antenna body 100, an epoxy may be applied to the area where cable 110 is attached to antenna body 100 to aid in the attachment of cable 110 to antenna body 100, and aid in weather sealing and insulating of the attachment configuration between cable 110 and antenna body 100. In addition, after cable 110 is attached to antenna body 100, heat shrink tube 113 may be applied to cable 110 such that cable 110 and tab 130 are retained within heat shrink tube 113. Tab 130 may be extended from antenna body 100, formed by two recesses in antenna body 100, or a combination thereof. Further, a liquid plastic coating may be applied to the attachment point of cable 110 and antenna body 100, and may cover the end of heat shrink tube 113 closest to the attachment point of cable 110 and antenna body 100.

Antenna body 100 may include one or more structures for attaching antenna body 100 to another object. For example, grommet 140, such as a nylon grommet, may be used to provide anchor hole 141 for antenna body 100. Grommet 140 may be installed in hole 131 in antenna body 100. The grommet 140 may be omitted. Additionally or alternatively, Velcro 154 may be used to attach antenna body 100 to the other object. Here, Velcro 154 may be adhered to protective layer 153 of antenna body 100.

In certain embodiments, antenna element 121, feed point 105, and through holes 103C and 103D may be omitted. In such an embodiment, the antenna body 100 may be sized such that the edge of antenna body 100 is about 0.270 inches from feed point 102. Further, in such an embodiment feed point 102 is acting as a mechanical anchor.

Antenna body 100 may have various sizes to accommodate various power, bandwidth, and installation requirements. Exemplary dimensions of two different sizes of antenna body 100 are provided below in Tables 1 and 2. These dimensions are merely exemplary and the present disclosure is not limited thereto. For example, one or more of the dimensions listed herein may vary, and such variation is within the scope of the present disclosure. For example, any of the dimensions identified herein may be increased or decreased by up to five, ten, twenty, fifty, etc. percent.

TABLE 1

| Dimension | Length in Inches |
|---|---|
| D1 | 6.915 |
| D1 (with grommet 140 omitted) | 6.228 |
| D2 | 3.790 |
| D3 | 1.367 |
| D4 | 0.469 |
| D5 | 0.219 |
| D6 | 0.026 |

TABLE 1-continued

| Dimension | Length in Inches |
|---|---|
| D7 (variable based on application) | 36.000 |
| D8 | 1.000 |
| D9 | 1.500 |
| D10 | 4.500 |
| D11 | 3.000 |
| D12 | 3.250 |
| D13 | 3.750 |
| D14 | 0.750 |
| D15 | 1.000 |
| D16 | 0.270 |
| D17 | 0.270 |
| D18 | 0.188 |
| D19 | 1.500 |
| D20 | 0.250 |

TABLE 2

| Dimension | Length in Inches |
|---|---|
| D1 | 4.057 |
| D1 (with grommet 140 omitted) | 3.370 |
| D2 | 2.125 |
| D3 | 1.117 |
| D4 (not applicable if grommet 140 is omitted) | 0.469 |
| D5 (not applicable if grommet 140 is omitted) | 0.219 |
| D6 | 0.026 |
| D7 (variable based on application) | 36.000 |
| D8 | 1.000 |
| D9 | 1.500 |
| D10 | 1.893 |
| D11 | 1.585 |
| D12 | 1.585 |
| D13 | 1.475 |
| D14 | 0.418 |
| D15 | 0.750 |
| D16 | 0.270 |
| D17 | 0.270 |
| D18 | 0.188 |
| D19 | 0.750 |
| D20 | 0.250 |

The present disclosure is not limited to the configuration illustrated FIGS. 1A-1D and any other configuration employing the techniques described herein are within the scope of the present disclosure. Another configuration employing the techniques described herein is illustrated in FIGS. 2A-2D.

FIGS. 2A-2D illustrate the patch antenna according to various embodiments of the present disclosure.

The features shown in FIGS. 2A-2D has been described above with respect to FIGS. 1A-1D and thus descriptions thereof are omitted for brevity. However, dimensions of the configuration shown in FIGS. 2A-2D differ from the dimensions of the configuration shown in FIGS. 1A-1D, and thus the dimensions of the configuration shown in FIGS. 2A-2D are provided below in Table 3.

TABLE 3

| Dimension | Length in Inches |
|---|---|
| L1 | 10.166 |
| L2 | 3.540 |
| L3 | 4.376 |
| L4 | 0.479 |
| L5 | 1.552 |
| L6 | 1.989 |
| L7 | 0.188 |
| L8 | 0.831 |
| L9 | 0.250 |

TABLE 3-continued

| Dimension | Length in Inches |
|---|---|
| L10 | 36.000 |
| L11 | 1.000 |
| L12 | 0.026 |
| L13 | 0.219 |
| L14 | 1.500 |
| L15 | 0.188 |
| L16 | 0.188 |
| L17 | 0.626 |
| L18 | 4.500 |
| L19 | 3.750 |
| L20 | 1.500 |
| L21 | 3.00 |
| L22 | 0.270 |
| L23 | 0.270 |
| L24 | 0.250 |

Conductive Particle Based Material

The conductive particle based material described herein may be the conductive particle based material described in U.S. Pat. No. 9,088,071, which issued on Jul. 21, 2015; the entire disclosure of which is hereby incorporated by reference.

In one exemplary embodiment, the conductive particle based material is employed. The conductive particle based material includes at least two constituent components, namely conductive particles and a binder. However, the conductive particle based material may include additional components, such as at least one of graphite, carbon (e.g., carbon black), titanium dioxide, etc.

The conductive particles may be any conductive material, such as silver, copper, nickel, aluminum, steel, metal alloys, carbon nanotubes, any other conductive material, and any combination thereof. For example, in one exemplary embodiment, the conductive particles are silver coated copper. Alternatively, the conductive particles may be a combination of a conductive material and a non-conductive material. For example, the conductive particles may be ceramic magnetic microspheres coated with a conductive material such as any of the conductive materials described above. Furthermore, the composition of each of the conductive particles may vary from one another.

The conductive particles may be any shape from a random non-uniform shape to a geometric structure. The conductive particles may all have the same shape or the conductive particles may vary in shape from one another. For example, in one exemplary embodiment, each of the conductive particles may have a random non-uniform shape that varies from conductive particle to conductive particle.

The conductive particles may range in size from a few nanometers up to a few thousand nanometers. Alternatively, the conductive particles may range in size from about 400 nanometers to 30 micrometers. The conductive particles may be substantially similar in size or may be of various sizes included in the above identified ranges. For example, in one exemplary embodiment, the conductive particles are of various sizes in the range of about 400 nanometers to 30 micrometers. Herein, when a range of sizes of the conductive particles are employed, the distribution of the sizes may be uniform or non-uniform across the range. For example, 75% of the conductive particles may be a larger size within a given range while 25% of the conductive particles are a smaller size.

An effective amount of conductive particles are included relative to the binder so that the conductive particles are dispersed in the binder. The conductive particles may be randomly or orderly dispersed in the binder. The conductive particles may be dispersed at uniform or non-uniform densities. The conductive particles may be dispersed so that at least a majority of the conductive particles are closely adjacent to, but do not touch, one another.

The binder is used to substantially fix the conductive particles relative to each other and should be a non-conductive or semi-conductive substance. Any type of conventional or novel binder that meets these criteria may be used. The non-conductive or semi-conductive material of the binder may be chosen to function as a dielectric with a given permittivity.

The conductive particle based material may be formed as a rigid or semi-rigid structure. For example, the conductive particle based material may be a plastic sheet having the conductive particles dispersed therein. The conductive particle based material may be clear or opaque, and may include any shade of color.

In addition, the conductive particle based material may be a liquid, paint, gel, ink or paste that dries or cures. Here, the binder may include distillates, hardening agents, or solvents such as a Volatile Organic Compound (VOC). In this case, the conductive particle based material may be applied to flexible circuit layer 151. Also, when the conductive particle based material is a liquid, paint, gel, ink or paste that dries or cures, the binder may adhere to flexible circuit layer 151. The conductive particle based material may be sprayed on, brushed on, rolled on, ink-jet printed, silk screened, etc. onto flexible circuit layer 151. The use of the conductive particle based material that is a liquid, paint, gel, ink or paste that dries or cures is advantageous in that the conductive particle based material may be thinly applied to flexible circuit layer 151 and conform to the surface of flexible circuit layer 151. This allows the conductive particle based material to occupy very little space and, in effect, blend into the flexible circuit layer 151.

An example of the conductive particle based material is described below with reference to FIG. 3.

Figure 3:
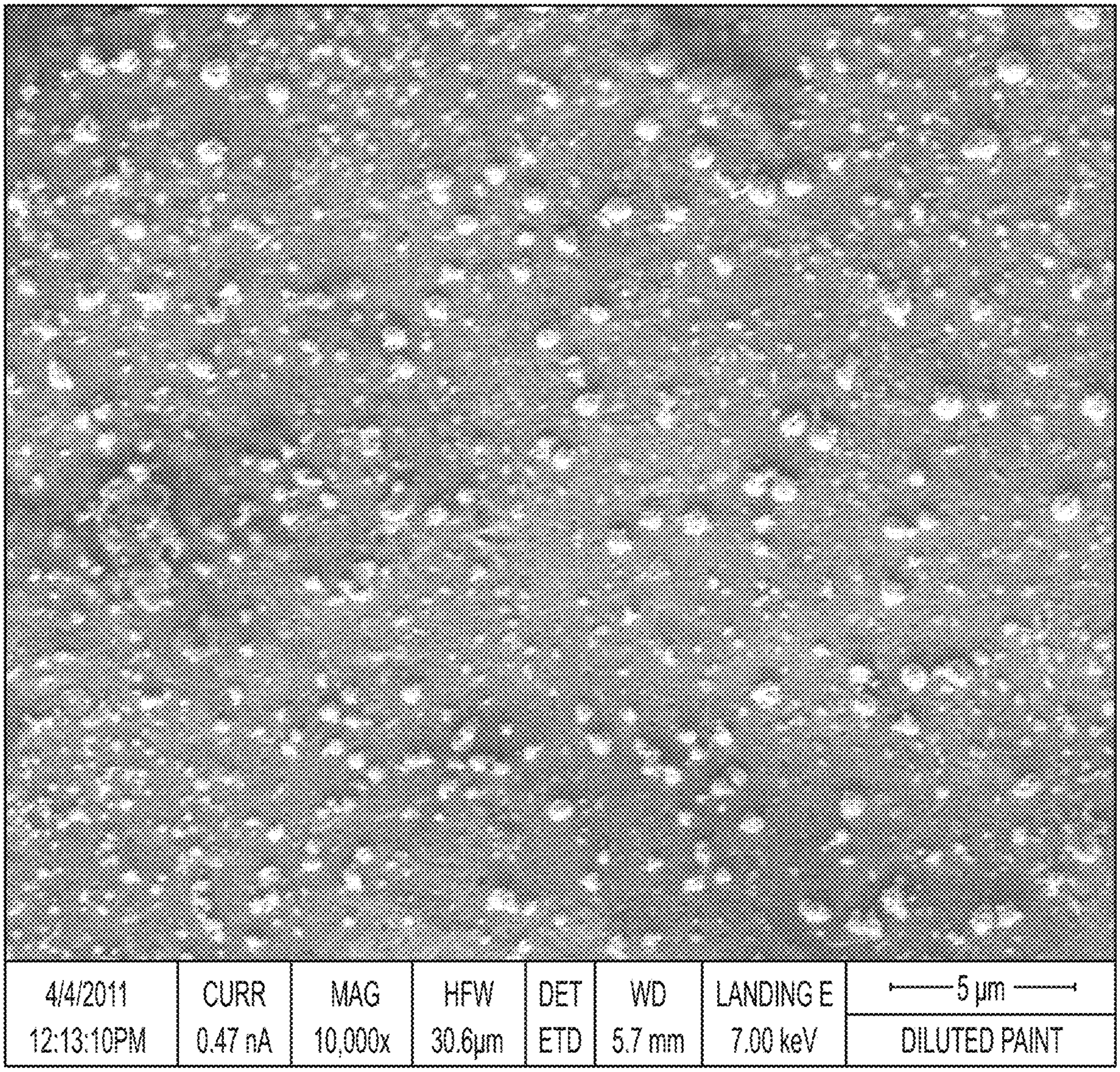
FIG. 3 is a captured image of a conductive particle based material according to various embodiments of the present disclosure.

FIG. 3 is a captured image of a conductive particle based material according to various embodiments of the present disclosure.

Referring to FIG. 3, the conductive particle based material includes conductive particles and a binder. The conductive particles are randomly shaped, sized and located. However, conductive particles are dispersed so that at least a majority of the conductive particles are closely adjacent to, but do not touch, one another.

Herein, without intending to be limiting, for a conductive particle based material of a given density of conductive particles, the conductive particle based material may be applied at a thickness such that the conductive particles are dispersed in the binder so that at least a majority of the conductive particles are closely adjacent to, but do not touch, one another. Herein, without intending to be limiting, it has been observed that a conductive particle based material has a resistance of about 3-17 ohms across any given two points on the surface.

Herein, without intending to be limiting, it has been observed that when the conductive particle based material is formulated such that the conductive particles are dispersed in the binder so that at least a majority of the conductive particles are closely adjacent to, but do not touch, one another, the conductive particle based material exhibits properties that enable it to at least one of efficiently propagate electromagnetic radiation, efficiently absorb electromagnetic radiation from space, and efficiently emit electromagnetic radiation into space. Moreover, it has been observed that those properties may be either supplemented or enhanced by including an effective amount of carbon, such as carbon black, in the conductive particle based material. For example, an effective amount of carbon black may be an amount that corresponds to about 1-7% of the conductive particles included in the conductive particle based material.

Without intending to be limiting, it is believed that when electromagnetic radiation is introduced into the conductive particle based material, electromagnetic radiation may pass from conductive particle to conductive particle via at least one of capacitive and inductive coupling. Here, the binder may function as a dielectric. Thus, it is believed that the conductive particle based material may act as an array of capacitors, which may be at least part of the reason why the conductive particle based material at least one of efficiently propagates electromagnetic radiation, efficiently absorbs electromagnetic radiation from space, and efficiently emits electromagnetic radiation into space.

Alternatively or additionally, and without intending to be limiting, it is believed that the properties that enable the conductive particle based material to at least one of efficiently propagate electromagnetic radiation, efficiently absorb electromagnetic radiation from space, and efficiently emit electromagnetic radiation into space, may be explained by quantum theory at the atomic level.

Herein, without intending to be limiting, it has been observed that the conductive particle based material generates electrical energy when exposed to sunlight.

Herein, without intending to be limiting, it has been observed that the resistance of the conductive particle based material continuously changes over time. Herein, without intending to be limiting, it has been observed that, when energized with a radio signal, the conductive particle based material has infinitely low resistance to that signal.

Herein, while the present disclosure is described in the context of electromagnetic radiation, without intending to be limiting, it is believed that the present disclosure is equally applicable to bioelectromagnetic energy. Thus, any disclosure herein that refers to electromagnetic radiation equally applies to bioelectromagnetic energy.

In one exemplary embodiment, the conductive particle based material is employed to implement antenna elements 102 and 121 of the antenna body 100. Here, the conductive particle based material may be formed into a shape for the antenna elements 120 and 121 that conforms to the desired characteristics of the antenna body 100. For example, the shape and size of the antenna elements 120 and 121 may vary depending on the frequency and/or polarization of the electromagnetic radiation to be communicated.

When the antenna body 100 is fabricated using the conductive particle based material, the antenna body 100 may exhibit a broad bandwidth self-tuning characteristic by using only a small section of the antenna elements 102 and 121 to emit the electromagnetic radiation into space.

In addition, when the antenna body 100 is fabricated using the conductive particle based material, there may be no or little $I^2R$ losses due the small practical size and the majority of the particles not contacting each other. In addition, there may be no or little Radio Frequency (RF) skin effect losses due to the small practical size. Once the signal is coupled to the antenna body 100 employing the conductive particle based material, the antenna body 100 provides little to no resistance to the transmission signal and it is emitted without significant loss into space. The same may happen in reverse for receiving. That is, the received signal may be absorbed and delivered with little to no loss to the coupling device and is then propagated down a feed line to a receiver.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A patch antenna comprising:
a cable comprising at least one conductor; and
an antenna body comprising:
a non-conductive sheet,
at least one conductive metallic feed pad disposed on the non-conductive sheet that is smaller than the non-conductive sheet, and
an antenna element formed of a conductive particle based material applied to the non-conductive sheet over at least a portion of the at least one conductive metallic feed pad and at least a portion of the non-conductive sheet that does not include the at least one conductive metallic feed pad,
wherein the conductive particle based material comprises conductive particles dispersed in a binder so that at least a majority of the conductive particles are adjacent to, but do not touch, one another,
wherein the binder is disposed between at least a part of the conductive particles that are adjacent to, but do not touch, one another,
wherein at least some of the conductive particles of the conductive particle based material that are adjacent to one another are at least one of capacitively or inductively coupled to one another, and
wherein the at least one conductor of the cable is electrically connected to the at least one conductive metallic feed pad.

2. The patch antenna of claim 1, further comprising a fabric hook and loop fastener affixed to one side of the patch antenna.

3. The patch antenna of claim 1, further comprising a grommet disposed in the patch antenna.

4. The patch antenna of claim 3, wherein the grommet is disposed in an opening through the antenna body.

5. The patch antenna of claim 1, further comprising:
a tab extending from an edge of the antenna body to which the cable is mechanically attached.

6. The patch antenna of claim 5, wherein the cable is mechanically attached to the tab using shrink tubing.

7. The patch antenna of claim 1, wherein the at least one conductor of the cable is soldered to the at least one conductive metallic feed pad.

8. The patch antenna of claim 1, wherein at least one of an epoxy or a liquid plastic is applied to the cable and the antenna body.

9. The patch antenna of claim 1, wherein the antenna body and the non-conductive sheet have substantially a same two dimensional shape.

10. The patch antenna of claim 1, wherein the at least one conductive metallic feed pad is disposed at least a distance from a closest edge of the non-conductive sheet.

11. The patch antenna of claim 1, wherein the at least one conductive metallic feed pad is formed from copper.

12. The patch antenna of claim 1, wherein the non-conductive sheet is formed from polyimide.

13. The patch antenna of claim 1, wherein the patch antenna is configured to be worn on a body of a person.

14. The patch antenna of claim 1, wherein the conductive particle based material is applied to the non-conductive sheet via one of being painted, spray painted, or silk screened.

15. The patch antenna of claim 1, wherein the non-conductive sheet includes at least one through hole electrically connecting the at least one conductive metallic feed.

* * * * *